(12) United States Patent
Fischer et al.

(10) Patent No.: US 9,602,990 B2
(45) Date of Patent: Mar. 21, 2017

(54) METHOD FOR PROVIDING NETWORK-BASED MEASUREMENTS FOR USER EQUIPMENT-BASED POSITIONING

(75) Inventors: Sven Fischer, Nuremberg (DE); Stephen W. Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 13/442,734

(22) Filed: Apr. 9, 2012

(65) Prior Publication Data

US 2012/0258733 A1    Oct. 11, 2012

Related U.S. Application Data

(60) Provisional application No. 61/474,142, filed on Apr. 11, 2011.

(51) Int. Cl.
| | |
|---|---|
| *H04W 64/00* | (2009.01) |
| *H04W 4/02* | (2009.01) |
| *H04W 4/20* | (2009.01) |
| *H04W 80/08* | (2009.01) |

(52) U.S. Cl.
CPC ............ *H04W 4/20* (2013.01); *H04W 4/02* (2013.01); *H04W 80/085* (2013.01)

(58) Field of Classification Search
CPC ......... H04W 64/00; H04W 4/02; H04W 4/20; H04W 4/023; H04W 4/025; H04W 64/003; H04W 4/22; H04W 4/021; G01S 19/46
USPC ............. 455/456.1, 456.2, 456.3, 456.5, 445
See application file for complete search history.

(56) References Cited

U.S. PATENT DOCUMENTS

| | | | |
|---|---|---|---|
| 7,376,430 B2* | 5/2008 | Matsuda | 455/456.2 |
| 7,595,754 B2 | 9/2009 | Mehta | |
| 2006/0194594 A1* | 8/2006 | Ruutu et al. | 455/456.5 |
| 2006/0293066 A1* | 12/2006 | Edge et al. | 455/456.3 |
| 2010/0117898 A1* | 5/2010 | Wigren | 342/357.09 |
| 2011/0034179 A1* | 2/2011 | David et al. | 455/456.1 |
| 2011/0064046 A1* | 3/2011 | Zhu | 370/331 |

(Continued)

FOREIGN PATENT DOCUMENTS

| | | |
|---|---|---|
| CN | 101931858 A | 12/2010 |
| CN | 101959122 A | 1/2011 |

(Continued)

OTHER PUBLICATIONS

"Functional stage 2 description of Location Services (LCS) (Release 10)", 3GPP TS 23271, XP050476350, 3GPPTS23.271 V10.2.0 (Mar. 2011).*

(Continued)

*Primary Examiner* — Inder Mehra
(74) *Attorney, Agent, or Firm* — Berkeley Law & Technology Group, LLP (57) ABSTRACT

The subject matter disclosed herein relates in one particular implementation to a method, apparatus, and/or system for acquiring one or more network-based measurements at a location server from a radio access network serving a user equipment (UE). A first message may be transmitted to the UE from the location server, where the first message comprises at least one of the one or more network-based measurements. A location of the UE is capable of being determined by the UE-based at least in part on the one or more network-based measurements.

81 Claims, 5 Drawing Sheets

(56) References Cited

U.S. PATENT DOCUMENTS

| | | | |
|---|---|---|---|
| 2011/0159893 A1* | 6/2011 | Siomina et al. | 455/456.3 |
| 2011/0200024 A1* | 8/2011 | Karaoguz et al. | 370/338 |
| 2011/0260863 A1* | 10/2011 | Hooli et al. | 340/539.32 |
| 2012/0088522 A1* | 4/2012 | Mills | 455/456.2 |
| 2012/0094683 A1* | 4/2012 | Yoeli | G01S 5/0027 455/456.1 |
| 2012/0231809 A1* | 9/2012 | Siomina et al. | 455/456.1 |

FOREIGN PATENT DOCUMENTS

| | | |
|---|---|---|
| CN | 101990297 A | 3/2011 |
| JP | H11178042 A | 7/1999 |
| JP | 2005181255 A | 7/2005 |
| JP | 2007135228 A | 5/2007 |
| JP | 2010230380 A | 10/2010 |
| WO | 2005074169 A1 | 8/2005 |
| WO | WO-2005088335 A1 | 9/2005 |
| WO | WO-2008127161 A1 | 10/2008 |
| WO | WO-2009082728 | 7/2009 |
| WO | WO-2010052673 A1 | 5/2010 |

OTHER PUBLICATIONS

3rd Generation Partnership Project ; Technical Specification Group Services and System Aspects; Functional stage 2 description of Location Services (LCS) (Release 10) , 3GPP Standard; 3GPP TS 23.271, 3rd Generation Partnership Project (3GPP), Mobile Competence Centre ; 650, Route Des Lucioles ; F-06921 Sophia-Anti Polis Cedex ; France, No. V10.2.0, Mar. 17, 2011 (Mar. 17, 2011), pp. 1-169, XP050476350, [retrieved on 2011-03-171 paragraphs [03.1] , [0009] -[9.1.3] ; figures 9.2,9.3.

International Search Report and Written Opinion—PCT/US2012/032914—ISA/EPO—Aug. 6, 2012.

\* cited by examiner

METHOD FOR PROVIDING NETWORK-BASED MEASUREMENTS FOR USER EQUIPMENT-BASED POSITIONING

CROSS-REFERENCES TO RELATED APPLICATIONS

This application claims priority to provisional patent application Ser. No. 61/474,142, entitled "Method for Providing Network Measurements for UE-Based Position Location," which was filed on Apr. 11, 2011.

BACKGROUND

Field

The subject matter disclosed herein relates to a method, apparatus, and/or system for providing network-based measurements to user equipment, such as a mobile device, for positioning.

Information

User Plane (UP) positioning comprises Secure User Plane Location (SUPL) specifications produced by the Open Mobile Alliance (OMA). UP positioning is not always dependent on an underlying Radio Access Network (RAN). User Equipment (UE) or a Mobile Station (MS) may communicate with a location server such as a SUPL Location Platform (SLP) via a data connection between the UE and the location server. The data connection may be supported by a serving wireless or wireline network including, for example, in the case of a wireless network, a RAN. Such a data connection may allow a location server to provide assistance data to a UE. Such assistance data may, for example, comprise Assisted-Global Navigation Satellite (A-GNSS) assistance data. A data connection may also allow the UE to report location measurements to the location server, such as A-GNSS pseudoranges, for server-based position calculation, e.g., a so-called UE-assisted mode. Assistance data may be collected by the location server via proprietary means, such as via a Wide Area Reference Network (WARN) for A-GNSS, or via an interface to the network Operation and Maintenance center (O&M), or via some other entity in a network which is capable of providing necessary assistance data to an SLP, such as, e.g., Base Station (BS) coordinates.

User Plane positioning solutions, such as SUPL, have been designed to work with any network technologies being used to provide network access and data transport. Therefore, User Plane positioning solutions may be independent of any particular access network, such as, for example, Global System for Mobile Communications (GSM), Universal Mobile Telecommunications System (UMTS), or Long Term Evolution (LTE), to name just a few examples. To enable access network independence for a UP location solution such as SUPL, for example, all measurements and information needed for position calculation of a terminal (e.g., a UE or MS) must be provided by the location server (e.g., SUPL Location Platform (SLP)) and/or by the terminal. User Plane positioning has been designed for UE centric location methods where no additional terminal specific measurements from the underlying access network (e.g. a RAN) are needed, such as A-GNSS based location methods. User plane positioning solutions such as SUPL may make use of measurements of a RAN (e.g., base stations and/or WiFi access points in the RAN) by the UE and are thus not always completely independent of a RAN. However, in a particular implementation, the solutions do not depend on measurements made by elements in the RAN of signals transmitted by the UE.

However, certain other positioning/location solutions may require measurements made at a base station or at other access points and nodes (e.g., Location Measurement Units (LMUs), WiFi Access Points, and so forth) within a RAN of signals transmitted by a UE. These other solutions may include so-called control plane solutions in which existing network interfaces and protocols are used to transfer control information and measurements. With a control plane location solution, measurements made of a target UE by network elements such as base stations, WiFi Access Points and LMUs are transferred to a location server for computation of the location of the UE. The measurements are not transferred to the UE and are thus not available to the UE to help the UE compute its own location—e.g., for UE-based mode operation with SUPL. As a result, User Plane positioning solutions such as SUPL cannot make use of network-based location technologies which require measurements performed within the access network. This may result in less accurate positioning and in some cases may result in an inability to obtain a location as, for example, when a UE is indoors and cannot measure a sufficient number of GNSS satellites and/or network base stations and WiFi access points to yield an accurate location estimate or any location estimate.

SUMMARY

In one particular implementation, a method is provided for performing location services. One or more network-based measurements may be acquired at a location server from a radio access network serving a user equipment (UE). A first message may be transmitted to the UE from the location server. The first message may comprise at least one of the one or more network-based measurements. A location of the UE may be determined by the UE based at least in part on the one or more network based measurements.

In one particular implementation, a location server is provided. The location server may include a receiver to receive one or more messages and a transmitter to transmit one or more messages. A processor may (a) process one or more network-based measurements obtained from a radio access network serving a user equipment (UE); and (b) initiate transmission of a first message to the UE comprising at least one of the one or more network-based measurements.

In one particular implementation, a location server is provided. The location server may comprise (a) means for acquiring one or more network-based measurements at the location server from a radio access network serving a user equipment (UE); and (b) means for transmitting a first message to the UE comprising at least one of the one or more network-based measurements.

In one particular implementation, an article is provided that comprises a non-transitory storage medium having machine-readable instructions stored thereon which are executable by a special purpose computing apparatus to: (a) process, at a location server, one or more network-based measurements received from a radio access network serving a user equipment (UE); and (b) initiate transmission of a first message to the UE comprising at least one of the one or more network-based measurements.

In one particular implementation, a method is provided that may be implemented at a user equipment (UE). A first message may be received from a location server, where the first message indicates one or more network-based measurements. A location of the UE may be determined by the UE-based at least in part on the network-based measurements.

In one particular implementation, a user equipment (UE) is provided. A transmitter may transmit one or more messages and a receiver may receive one or more messages. A processor may (a) process a first message received from a location server, the first message comprising one or more network-based measurements; and (b) determine a location of the UE-based at least in part on the one or more network-based measurements.

In one particular implementation, a user equipment (UE) is provided. The user equipment may comprise (a) means for receiving a first message from a location server comprising one or more network-based measurements; and (b) means for determining a location of the UE-based at least in part on the one or more network-based measurements.

In one particular implementation, an article is provided that comprises a non-transitory storage medium having machine-readable instructions stored thereon which are executable by a special purpose computing apparatus to: (a) initiate transmission of a first message from a user equipment (UE) to a location server comprising one or more network-based measurements; and (b) process a second message received by the UE from the location server comprising at least one of the one or more network-based measurements.

DETAILED DESCRIPTION

Mobile devices, such as mobile phones, notebook, computers, etc., may have an ability to estimate location and/or position with a relatively high degree of precision using any one of several technologies such as, for example, satellite positioning systems (e.g., GPS, Galileo, Glonass and the like), advanced forward link trilateration (AFLT), or Observed Time Difference of Arrival (OTDOA) just to name a few examples. Location or position estimation techniques may include processing of measurements which are based at least in part on signals acquired at or by a receiver of a mobile device. For example, a mobile device may acquire satellite positioning system (SPS) signals or pilot or other reference signals transmitted from a terrestrial base station. Various measured characteristics of acquired signals such as phase, signal strength, time of arrival and/or round trip delay may be utilized to compute a position or location fix of a mobile device.

There are two basic modes of location technology for mobile devices; (a) MS- or UE-based mode and (b) MS- or UE-assisted mode. These two modes differ in where the final position calculation is being performed. In UE-assisted mode, the UE performs the measurements and transfers these to a location server where the UE location is calculated. In UE-based mode, the UE performs the measurements and then calculates the location itself. In both modes, a location server may provide assistance data to the UE to assist the UE in acquiring and measuring signals (e.g., of GNSS satellites or network base stations). In UE-based mode, the server may also provide assistance data to help enable the UE to compute its location: such assistance data may include orbital (ephemeris) data for GNSS satellites if A-GNSS positioning is used and/or data for network base stations and access points (e.g., base station or access point locations and transmission characteristics) if terrestrial positioning methods such as AFLT or OTDOA are used.

A "location" as referred to herein may refer to information associated with a whereabouts of an object or thing according to a point of reference. Location may also be referred to as a location estimate, position or position estimate—these terms being used synonymously herein. Here, for example, a location may be represented as geographic coordinates such as latitude and longitude. Alternatively, such a location may be represented as a street address, municipality or other governmental jurisdiction, postal zip code and/or the like. However, these are merely examples of how a location may be represented according to particular embodiments and claimed subject matter is not limited in these respects. A UE that supports SUPL, also referred to herein as a SUPL Enabled Terminal (SET), may estimate its location based at least in part on navigation signals from a Satellite Positioning System (SPS), such as GPS, Galileo or Glonass by, for example, correlating pseudorange measurements from several (e.g., four or more) satellite transmitters. Alternatively, such a location may be estimated from a hybrid system in which a position of a cell based transceiver is determined from a combination of at least: (a) a time measurement that represents a time of travel of a message in the cell based communication signals between the cell based transceiver and a communication system; and (b) a time measurement that represents a time of travel of an SPS signal.

However, a mobile device may not always have access to SPS signals, such as within certain geographical areas such as canyons or within indoor locations. Moreover, some mobile devices may not be enabled to process SPS signals, for example. A mobile device may not also have access to signals from enough network base stations and other access points to determine its location in the absence of SPS capability. Typically, a mobile device would need to receive and measure signals from at least three and preferably four base stations and access points in order to determine its location (e.g., using AFLT or OTDOA in UE-based mode), but if the mobile device is not enabled to support this positioning or if the network is unable to provide the necessary assistance data (e.g. accurate locations and timing information for the base stations and access points), or if the mobile device cannot receive signals from at least three base station and access points having a good geometry, then a location estimate or an accurate location estimate may not be possible.

Certain positioning or location technologies may employ measurements made at a base station, access point or other entity such as an LMU within a radio access network. Such location technologies may be referred to as network-based location methods. Base station measurements may include Round Trip Time (RTT) measurements or other Receive (Rx) Transmit (Tx) Time offsets (e.g., "evolved Node B (eNB) Rx Tx time difference" as defined for $3^{rd}$ Generation Partnership Project (3GPP) Long Term Evolution (LTE). RTT may comprise a Universal Mobile Telecommunications System (UMTS) Terrestrial Radio Access Network (UTRAN) measurement made by a base station referred to as a Node B in a UMTS RAN. RTT measurements and Rx/Tx time offsets may be indicative of a round-trip signal propagation time between a mobile device and a network base station or access point. Using the known signal propagation velocity (normally the speed of light), a distance may be determined between a mobile device and network base station or access point which can then be used to help determine the location of the mobile device (e.g. making use of the known location of the base station or access point). For example, an RTT measurement may be combined with two OTDOA or AFLT measurements to locate the mobile device.

In addition to or instead of obtaining an RTT measurement, a network base station, access point or LMU may obtain a time of arrival for some signal transmitted from a mobile device. The time of arrival may be determined relative to the transmission timing of a particular base station or access point (including any base station or access point that made the measurement) or relative to absolute GNSS (e.g., GPS) time. Additional time of arrival measurements may be obtained by other base stations and access points. These measurements may be provided to a common location server which may derive the location of the mobile device (e.g., making use of the known locations of the base stations, access points and LMUs) using such position methods as Uplink Time Difference of Arrival (U-TDOA) or Time of Arrival (TOA).

Other types of base station (BS) measurements of signals from a mobile device may include angle of arrival (AOA) measurements, received total signal power measurement, or any other measurements made by a RAN. Certain BS measurements may be further combined at a location server with UE measurements provided by a UE using UE-assisted mode positioning in order to be useful for position location purposes. In an example, BS measurements may comprise any UTRAN measurement as standardized in 3GPP TS 25.215 or an Evolved UTRAN (E-UTRAN) measurement as standardized in 3GPP TS 36.214.

For example, Round Trip Time (RTT) measurements may be useful for positioning within UMTS. The RTT in UMTS is the time required for a downlink (DL) transmission from a BS (Node B) to a User Equipment (UE) plus the time for an uplink (UL) transmission from the UE to the BS. "User Equipment (UE)," as used herein may refer to a device used directly by an end-user to communicate within UMTS, for example. In an implementation, User Equipment may comprise a mobile device such as a hand-held telephone, a laptop computer equipped with a mobile broadband adapter, to name just two possible examples.

In order to utilize an RTT measurement to compute a distance between user equipment and a base station for location estimation purposes, an internal processing delay for the user equipment between reception of a DL signal and transmission of a UL signal may need to be taken into account in some implementations. This internal delay may not comprise a fixed time delay within UMTS and may be measured by user equipment and denoted as a "UE Rx-Tx Time difference." RTT and a UE Rx-Tx time difference may be combined to allow a distance to be computed between the user equipment and the network element from which a DL signal was transmitted and to which the UL signal is transmitted. For example, if an RTT is measured to be 1.00 usec and a UE Rx-Tx time difference is measured to be 0.40 usec, the Rx-Tx time difference may be subtracted from the 1.00 usec RTT, resulting in a time interval of 0.60 usec, the total time interval during which the UL and DL signals were propagating between the UE and the network element. Such a time interval may be divided by a factor of 2 to account for the separate transmissions of UL and DL signals between the user equipment and the base station, to generate a one-way time interval of 0.30 usec. This one-way time interval may be multiplied by the speed of light, at which the wireless signals travel, e.g., 299,792,458 meters/second, to calculate that the distance between the UE and the network element is about 89.93 meters.

Methods described above for estimating a distance between user equipment and a network element may be utilized in UMTS positioning in UE-assisted mode, such as in control plane positioning where a positioning process is tightly integrated into a radio access network operation. In control plane solutions, the signaling used to initiate a positioning event and the signaling related to the positioning event itself may occur over control channels of the network. Such control channels typically provide no means for delivering network based measurements to a terminal, since in normal network operation such network based measurements are only needed at the network itself (e.g., in a network location server) and not at the terminal. Therefore, the network based measurements used for positioning of a terminal cannot be provided to the terminal, since no control channels are available for a measurement delivery to the terminal. As a result, network based measurements such as the RTT described above may currently only be used for network based positioning solutions, where the position is calculated at the network (e.g., at a location server), as for example described in 3GPP TS 25.305 for UMTS and 3GPP TS 36.305 for LTE.

In the above examples, network-based measurements such as RTT, signal strength, time of arrival, AOA may be obtained by a network element such as a base station, access point or LMU and may be provided to a network location server for computation of the location of a mobile device. In some cases, the mobile device may provide additional measurements in UE-assisted mode to the network location server to help the location server determine the location of the mobile device. Both types of measurement may be needed to obtain a location estimate or an accurate location estimate as either type of measurement by itself may be insufficient. However, current location solutions may not permit a location server or network to send network based measurements to a mobile device. For example, with control plane location solutions such as those defined in 3G PP TS 25.305 and TS 36.305 and with user plane solutions like SUPL, the control plane or user plane protocols and procedures make no provision for sending of network based measurements to a mobile device. A consequence is that when UE-based positioning is used with either a control plane or user plane location solution, an UE may obtain insufficient measurements to obtain its location or obtain its location accurately. However, UE-based positioning may otherwise be more efficient and more accurate than UE-assisted positioning or network based positioning because there is less load and dependence on the network and network location server. There may thus be an advantage in enabling the transfer of network-based position measurements to a mobile device.

Another example implementation where both UE-based and network-based measurements may need to be available to the UE for UE-based location includes a Timing Advance (Tadv)-based location method in Long Term Evolution (LTE). A timing advance in LTE is similar to RTT utilized in UMTS distance information which may be exploited for position location purposes. A timing advance in LTE is defined as a time interval or difference between an eNB Rx-Tx time difference and a UE Rx-Tx time difference, where "eNB" refers to an evolved NodeB, or evolved BS.

Other network based location methods may include U-TDOA methods for UMTS and LTE—e.g., as described in 3GPP TS 25.305. In a particular implementation for UE-based location determination, such U-TDOA measurements may need to be made available to the UE for positioning. For example, it may be advantageous to combine network-based U-TDOA measurements with e.g., A-GNSS pseudo-range measurements at a UE for hybrid UE-based location estimation or determination.

Accordingly, in certain implementations, it may be beneficial to provide base station and other network-based measurements to a UE for UE-based location determination, without impacting existing location solutions and architectures.

According to one or more implementations, a method may provide base station or other network based measurements to a UE, for example, to allow the UE to perform UE-based positioning. An implementation may be utilized within a User Plane process, such as via the SUPL protocol. However, it should be appreciated that such a method may also be utilized for control plane positioning. An implementation may utilize and extend a reversed mode of a Provide Location procedure as is defined in the OMA LPP Extensions (LPPe) Specification OMA-TS-LPPe-V1_0 location standard, where "LPPe" refers to Extensions to the LTE Positioning Protocol (LPP) defined in 3GPP TS 36.355.

According to an LTE Positioning Protocol (LPP), a server may transmit a Request Location Information message to UE, and the UE may obtain and then transmit requested location measurements (e.g., for UE-assisted mode) or a location estimate (e.g., for UE-based mode) in an LPP Provide Location Information message to the server in response to receiving the LPP Request Location Information message. In the OMA LPPe standard, the LPP protocol is extended using LPPe by adding an LPPe message extension to an LPP message. With the combined LPP/LPPe protocol, the location information request and provide procedure is allowed in a reverse mode, where the UE can send an LPP/LPPe Request Location Information message to the server, as described in OMA-TS-LPPe-V1_0. This reverse mode message may indicate a desired Quality Of Service (QoS) (e.g., desired location accuracy). After reception of this LPP/LPPe reverse mode Request Location Information message at the server, the server would instigate a particular location estimation method (e.g., collect measurements from the UE), calculate the UE location, and send the calculated location result back to the UE in an LPP/LPPe reverse mode Provide Location Information message. This reversed mode of the Location Procedure enables a Mobile-Originated Location Request (MO-LR) at positioning protocol level (e.g., within LPPe). This reverse mode capability may be extended further to enable a UE to request particular network based measurements from a location server in an LPP/LPPe Request Location Information. For example, a UE may request an RTT measurement, a TA measurement, signal strength measurements and/or U-TDOA measurements. These measurements may then be obtained by the location server (e.g., by means of a request sent to the RAN) and returned to the UE in an LPP/LPPe reverse mode Provide Location Information message. It should be noted that while the UE may request these measurements, it is also possible in an alternative design for a location server to provide the measurements to a UE (e.g., using an LPP/LPPe reverse mode Provide Location Information message) without first receiving a request from the UE. This alternative design may be used if the server is aware that the UE may be in an environment (e.g., indoors) where measurements of GNSS satellites and network base stations and access points will be difficult and/or when the server wishes to enable the UE to obtain a more accurate location estimate than is possible using UE-based location alone.

Figure 1:
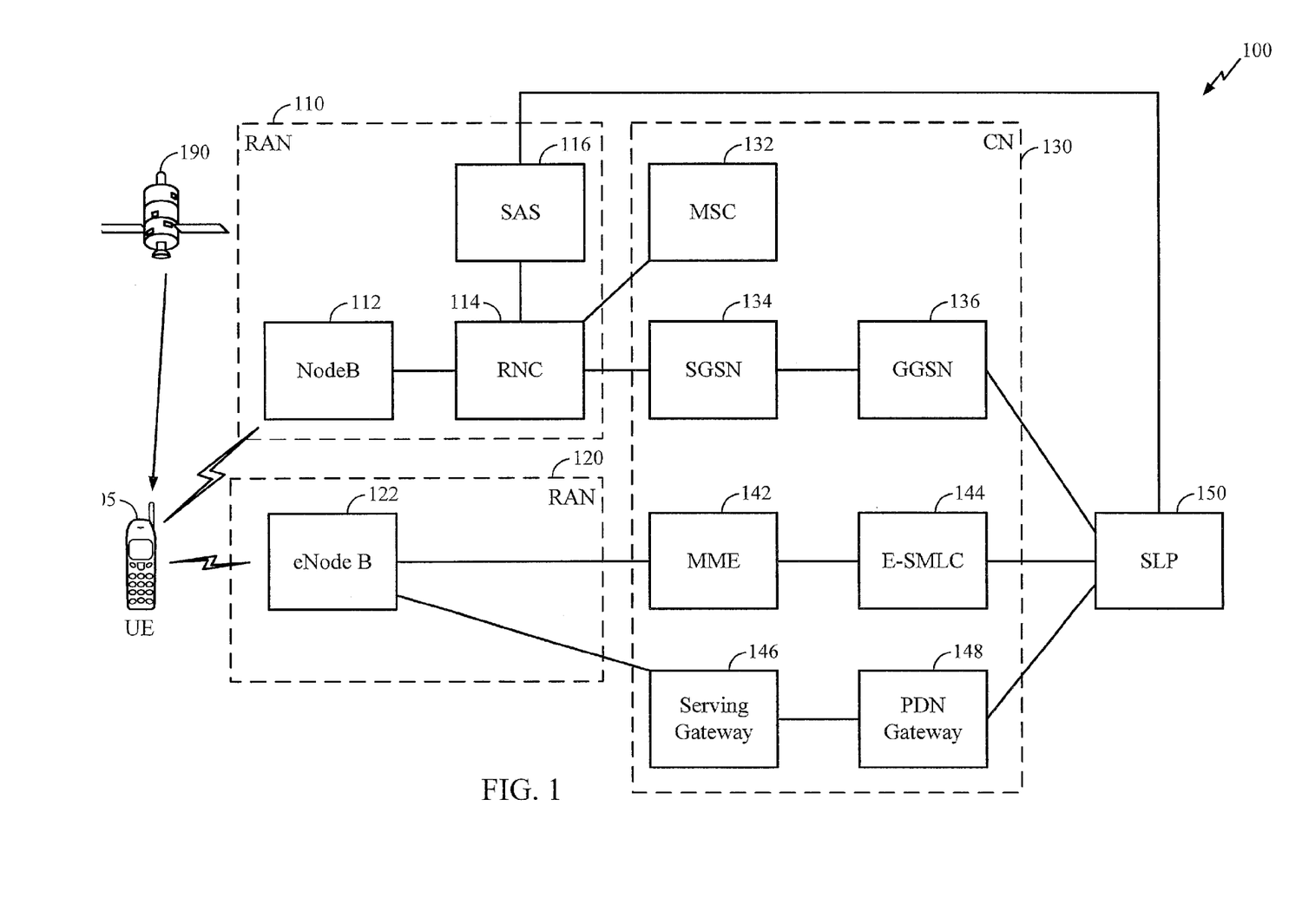
FIG. 1 is a diagram of a communication system according to one implementation.

FIG. 1 is a diagram of a communication system 100 according to one implementation. Communication system 100 may comprise an LTE based system and a UMTS-based system—for example belonging to an operator who has deployed both UMTS and LTE in the same geographic area as is the case for a number of wireless operators in North America, Europe and Asia. As shown, communication system 100 may include User Equipment (UE) 105, a UMTS Radio Access Network (RAN) 110, including at least one base station 112, referred to as a Node B, at least one Radio Network Controller (RNC) 114, and at least one Standalone Serving Mobile Location Center (SAS) 116. SAS 116 may support positioning for UEs communicating with RAN 110. Communication system 100 may also include an LTE RAN 120 containing at least one base station for LTE, referred to as an eNode B 122. Communication system 100 may also include a Core Network (CN) 130. Core network 130 may support various services for UEs communicating with RAN 110 and RAN 120. Within core network 130, a Mobile Switching Center (MSC) 132 may perform switching and signaling functions for Circuit Switched calls for UEs within its coverage area. A Serving GPRS Support Node (SGSN) 134 may perform signaling, switching and routing functions for Packet Switched connections and sessions for UEs communicating with RAN 110. A Gateway GPRS Support Node (GGSN) 136 may perform various functions such as maintenance of data connectivity for UEs, IP address allocation, IP routing, and so forth.

For UEs communicating with LTE RAN 120, CN 130 may contain a Mobility Management Entity (MME) 142 which may perform various control functions such as mobility management, gateway selection, authentication, bearer management, etc. for LTE access. An Evolved SMLC (E-SMLC) 144 may support positioning for UEs communicating with RAN 120. A serving gateway (S-GW) 146 may perform various functions related to data transfer for UEs such as data routing and forwarding, mobility anchoring, for example. A Packet Data Network (PDN) gateway 148 may perform various functions such as maintenance of data connectivity for UEs, IP address allocation, IP routing, and so forth.

UE 105 may communicate with communication system 100 to obtain communication services. UE 105 may be stationary or mobile and may also be referred to as a mobile station, an access terminal, a SET, a subscriber unit, or a station, for example. UE 105 may comprise a cellular phone, a personal digital assistant (PDA), a wireless device, a wireless modem, a wireless router, a laptop computer, a telemetry device, a tracking device, to name just a few examples. UE 105 may communicate with one or more base stations in RAN 110 (e.g., Node B 112) or RAN 120 (e.g., eNode B 122). UE 105 may also receive and measure signals from one or more satellites 190 and obtain pseudo-range measurements for the satellites. UE 105 may also measure signals from base stations in RAN 110 and/or RAN 120 and obtain timing measurements, signal strength measurements, and/or signal quality measurements for the base stations. The pseudo-range measurements, timing measurements, signal strength measurements, and/or signal quality measurements may be used to derive a location estimate for UE 105. If UE 105 is unable to obtain sufficient measurements from satellites 190 and base stations in RAN 110 and RAN 120 to obtain a location estimate or an accurate location estimate, UE 105 may request a location server in communication system 100 to provide network based measurements—e.g., measurements obtained by Node B 112 or RNC 114 in RAN 110 or by eNode B 122 in RAN 120. Depending on the location solution used by UE 105 and communication system 100, the location server may be SAS 116, E-SMLC 144 or SLP 150 (as described below). Communication system 100 in FIG. 1 may also include a SUPL Location Platform (SLP) 150 which may be external to RAN 110, RAN 120 and CN 130 or part of CN 130. SLP 150 may comprise a Home SLP (H-SLP), Discovered SLP (D-SLP) or Emergency SLP (E-SLP) and may include a SUPL Location Center (SLC) and possibly a SUPL Positioning Center (SPC) (not shown in FIG. 1). The SLC may perform various functions for location services, coordinate the operation of SUPL, and interact with SUPL enabled terminals (SETs). The SPC may support positioning for SETs and delivery of assistance data to the SETs and may also be responsible for messages and procedures used for position calculation. SLP 150 may support positioning of UE 105 using the SUPL user plane location solution when UE 105 is accessing either UMTS RAN 110 or LTE RAN 120 or some other RAN not shown in FIG. 1. SLP 150 may communicate directly with UE 105 via user plane protocols, such as SUPL with embedded LPP/LPPe messages which may be transported using TCP/IP either via GGSN 136, SGSN 134, RNC 114 and Node B 112 if UE 105 is accessing RAN 110 or via PDN Gateway 148, S-GW 146 and eNodeB 122 if UE 105 is accessing RAN 120. SLP 150 may be enabled to request information (e.g., network based positioning measurements of UE 105) from entities in RAN 110, RAN 120 or in CN 130 in some implementations, e.g., from SAS 116 or Node B 112 located in RAN 110 in the case of UMTS access by UE 105 or from eNodeB 122 or E-SMLC 144 in the case of LTE access by UE 105. SLP 150 may be connected to or combined with SAS 116 or E-SMLC 144 or both in some implementations.

In an implementation, if UE 105 is accessing UMTS RAN 110, Node B 112 may be capable of measuring an RTT between transmission of a signal to UE 105 and reception of the corresponding signal from the UE 105. RTT may be utilized to estimate a range between Node B 112 and UE 105. However, as discussed above, there may be a processing delay incurred by UE 105 designated above as UE Rx-Tx Time Difference. Accordingly, to be able to accurately estimate the range between Node B 112 and UE 105, the Rx-Tx Time Difference may be subtracted from an RTT measurement. In certain implementations, Node B 112 or any other entity in RAN 110 may request UE 105 to perform UE Rx-Tx Time Difference measurements and report these measurements to an entity within RAN 110 where the distance calculation is performed. The distance calculations may be performed in SAS 116 in some implementations taking the BS RTT and UE Rx-Tx Time Difference into account.

According to an implementation, as discussed further below, Node B 112 may transmit a measurement of an RTT to SLP 150. Similarly, other network elements or entities may also transmit information to SLP 150 which may be utilized to estimate a position. SLP 150 may subsequently transmit an RTT measurement and/or other network based measurements and position-related information to UE 105 to allow UE 105 to estimate its own position. For example, network measurements from a WiFi Access Point may also be transmitted to UE 105.

In an implementation, a reverse mode of a Location Procedure may be extended to allow for a base station-assisted location method operation to occur at UE 105, as discussed further below.

Figure 2:
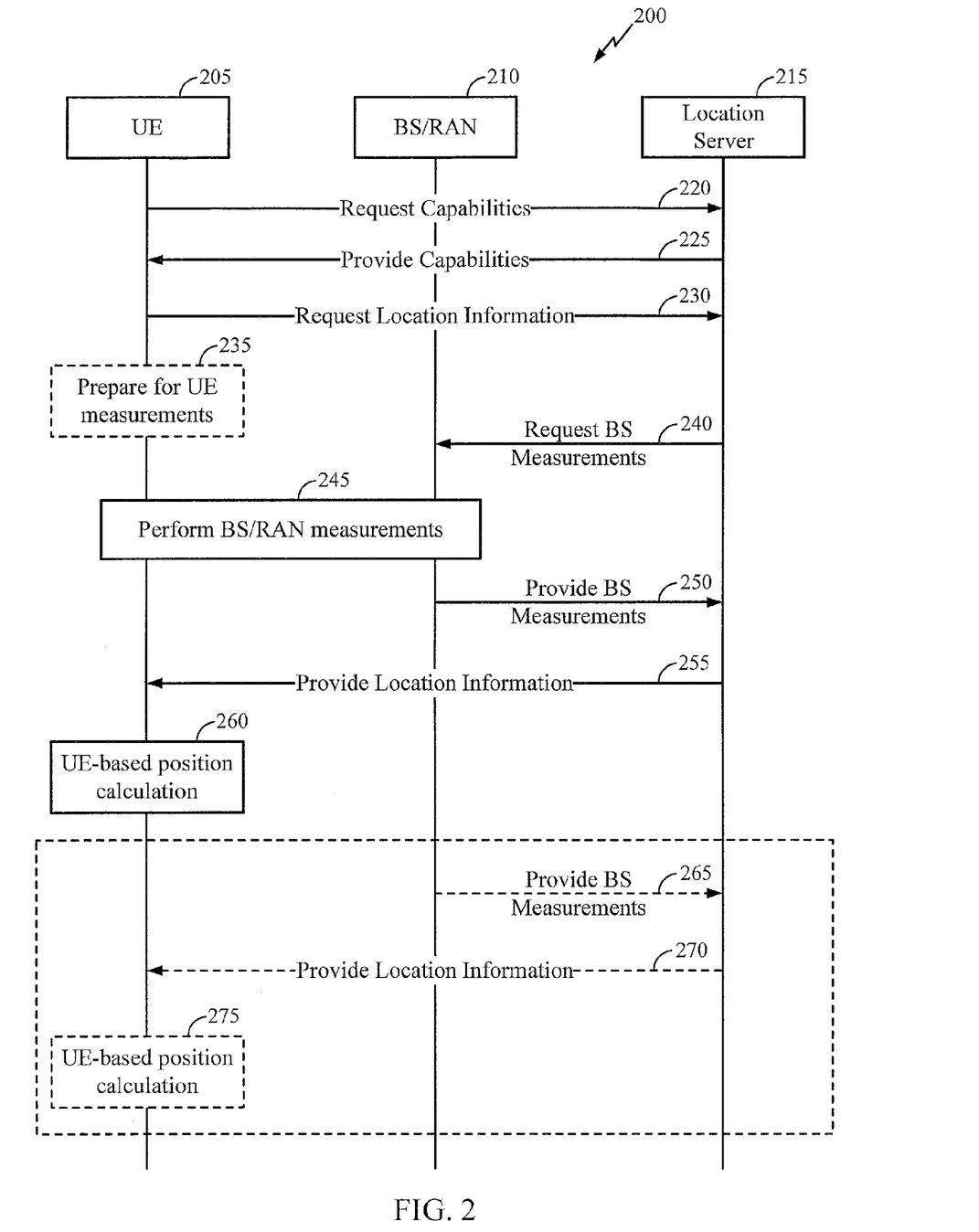
FIG. 2 is a message flow diagram of a method for base station-assisted positioning according to one implementation.

FIG. 2 illustrates a message flow diagram for a method 200 for base station-assisted positioning according to one implementation. FIG. 2 illustrates message flows between a UE 205, a BS/RAN 210, and a location server 215. Implementations in accordance with claimed subject matter may include all of, less than, or more than operations 220-275. Also, the particular order of operations 220-275 is merely an example order. UE 205 in FIG. 2 may correspond to UE 105 in FIG. 1. BS/RAN 210 may correspond to one or more of Node B 112, RNC 114 and eNode B 122 in FIG. 1. Location server 215 may correspond to SAS 116, E-SMLC 144 or SLP 150 in FIG. 1.

At operation 220, UE 205 may transmit a message comprising one or more LPP/LPPe reverse mode Request Capabilities messages to location server 215 in order to obtain position or location capabilities of the location server 215. Location capabilities may include, for example, position or location methods supported by location server 215. A reverse mode use of the Request Capabilities message is defined in the OMA LPPe location protocol standard, and may be extended to indicate additional location capabilities, such as BS-assisted capabilities described herein. If location server 215 is capable of obtaining BS or other RAN/network based measurements from BS/RAN 210, the location server 215 may indicate this capability to UE 205 in an LPP/LPPe reverse mode Provide Capabilities message transmitted at operation 225. Location server 215 may also transmit information or details about which measurements are supported and can be provided, including together with a supported triggered measurement delivery method such as, e.g., periodic reporting, or event triggered reporting based upon a change of a measurement parameter, to name just a couple possible examples. Examples of measurements that may be indicated as supported include ability to provide RTT, TA, signal strength, AOA and U-TDOA measurements for UMTS and/or for LTE. UE 205 may in addition or instead include its positioning capabilities in the message transmitted at operation 220—such as, for example, a list of the network based RAN measurements that UE 205 supports. These positioning capabilities may be included in an LPP/LPPe Provide Capabilities message.

If location server 215 supports BS-assisted location measurements, then at operation 230, UE 205 may, for example, transmit a Request Location Information message to location server 215 requesting BS/RAN measurements, together with desired reporting information and other quality of service parameters (e.g., a desired accuracy of the BS/RAN measurements). Such desired reporting information may, for example, include a request for a single measurement, a request for periodic measurement reporting, or a request for event triggered measurement reporting, to name just a few possible examples. A request for event triggered measurement reporting may, for example, include a threshold parameter indicating when location server 215 should transmit measurements to UE 205. For example, UE 205 may request a new BS/RAN measurement to be delivered if the BS/RAN measurement has changed by a certain threshold quantity or amount as compared to a previously delivered BS/RAN measurement. A Request Location Information message transmitted in operation 230 may comprise an OMA LPP/ LPPe reverse mode Request Location Information message.

In an alternative design, operation 230 may not occur and location server 215 may decide to obtain network based measurements from RAN 210 on behalf of UE 205—e.g. based on positioning capabilities provided by UE 205 to location server 215 in operation 220.

If UE 205 desires to use BS/RAN measurements together with UE measurements (e.g., such as combining a BS RTT measurement with a UE Rx-Tx Time difference measurement), UE 205 may prepare its measurement unit for the UE-based measurements at operation 235, and may start performing the UE-based measurements. If BS and UE measurement are to be combined, it may be desired that both measurements be made at approximately the same time or within a time range of approximately 10-100 ms, for example. Therefore, UE 205 may begin to measure signals from GNSS satellites and/or from base stations and access points including base stations and access points associated with or part of BS/RAN 210. UE 205 may temporarily store the UE-based measurement results together with a time stamp or time stamps indicative of a time or times at which the measurement results were obtained (e.g., a system frame number in UMTS or LTE or a GNSS time).

At operation 240, location server 215 may contact a RAN associated with UE 205 to obtain requested BS/RAN measurement information. If location server 215 is a SUPL SLP (e.g., SLP 150 in FIG. 1), the location server 215 may instead in operation 240 contact a control plane (CP) location server within RAN 210 or within a core network (CN), such as (i) E-SMLC 144 in FIG. 1 if UE 205 has LTE access (e.g., to eNode B 122 in FIG. 1) or (ii) SAS 116 in FIG. 1 if UE 205 has UMTS access or (iii) a Serving Mobile Location Center (SMLC) not shown in FIG. 1 if UE 205 has GSM access, to name just a few examples. In this case (which is not shown in FIG. 2), the CP location server may obtain the requested BS/RAN measurement information from a RAN on behalf of location server 215 and return the measurements in operation 250. A request message transmitted at operation 240 may include an identity of a UE 205 for which the BS/RAN measurements are requested, as well as an indication of the BS/RAN measurements requested and desired reporting criteria such as, for example, a reporting interval, an amount of reports, a threshold change parameter, and so forth.

At operation 245, RAN 210 (or any location server within the RAN 210 or in a CN associated with RAN 210) may instigate CP procedures to obtain requested measurements at BS/RAN 210 for the particular UE 205, as, for example, described above for BS RTT measurements. From a UE 205 point of view, such CP procedures may typically be a part of any normal network operation, and may not require any special UE 205 support. BS/RAN 210 may perform desired measurements at certain entities (e.g., certain base stations or access points) in BS/RAN 210 such as, for example, RTT, AOA, received signal power, U-TDOA or whatever is requested by location server 215 and is supported by BS/RAN 210. Such measurements may also be performed by dedicated Location Measurement Units (LMUs) in or associated with BS/RAN 210, as used for example in a U-TDOA positioning method.

At operation 250, BS/RAN 210 (or any location server within the RAN or CN, if applicable) may report obtained measurements to location server 215 in a Provide BS Measurements message. For example, obtained measurements may be transmitted together with any obtained quality information of the measurements such as, for example, a standard deviation, along with a time stamp indicating when the measurements were obtained.

Messages transmitted between location server 215 and BS/RAN 210 via operations 240 and 250 may comprise proprietary messages, agreed between a particular network operator and location server provider, or may be standardized messages in an existing or a future standard, for example. In an LTE CP deployment implementation, location server 215 may comprise an Evolved Serving Mobile Location Center (E-SMLC) such as E-SMLC 144 in FIG. 1, and messages transmitted at operations 240 and 250 may comprise existing or extended versions of LPP Annex (LPPa) messages, as defined in 3GPP TS 36.455.

In an alternative embodiment, location server 215 may comprise an SLP, such as SLP 150 in FIG. 1, and may contact an E-SMLC, such as E-SMLC 144 in FIG. 1, in operation 240 as described above. The contacted E-SMLC may exchange LPPa messages with BS/RAN 210 in order to obtain network based measurements of UE 205 such as RTT, AOA, or TA, for example, from BS/RAN 210 for transfer back to location server 215 in operation 250.

After location server 215 has received BS/RAN measurements at operation 250, location server 215 may transmit a Provide Location Information message to UE 205 at operation 255. A Provide Location Information message may include measurements requested by UE 205 at operation 230 or a subset of the requested measurements, for example. A Provide Location Information may also include an error indication if not all UE requested measurements are capable of being provided in an implementation. If operation 230 did not occur, on the other hand, the measurements may comprise measurements decided by location server 215 and/or measurements indicated as supported by UE 205 at operation 220 in an LPP/LPPe Provide Capabilities message. A Provide Location Information message transmitted at operation 255 may comprise an OMA LPP/LPPe reverse mode Provide Location Information message.

As part of operation 255 or before or after operation 255 (and not shown in FIG. 2), location server 215 may transmit a Provide Assistance Data message (e.g., an LPP or LPP/ LPPe Provide Assistance Data message) to UE 205 containing assistance data related to the BS/RAN measurements transmitted to UE 205 at operation 255. In one design, UE 205 may previously have sent a Request Assistance Data message (e.g., an LPP or LPP/LPPe Request Assistance Data message) to location server 215 to request this assistance data. The assistance data may comprise information about BS/RAN 210 to enable UE 205 to utilize the BS/RAN measurements received at operation 255 to estimate the location of UE 205. Examples of information about BS/RAN 210 that may be included comprise the location coordinates, antenna characteristics and internal timings of certain entities in BS/RAN 210 such as for example certain base stations, access points and LMUs. The particular entities in BS/RAN 210 for which the information is provided may be the same entities that obtained the BS/RAN measurements at operation 245. In one design, UE 205 may obtain the assistance data at some earlier time—e.g., during a previous invocation of the message flow in FIG. 2—and store the assistance data for later use.

At operation 260, UE 205 may utilize received BS/RAN measurements and any assistance data received as described above to estimate or calculate a UE location. If additional UE-based measurements of GNSS satellites and/or RAN base stations and access points were obtained by UE 205 at operation 235, UE 205 may obtain its location from both these measurements and from the BS/RAN measurements provided at operation 255 and may verify that the measurements were obtained at approximately the same time. For example, BS/RAN measurements may include RTT measurements made at a serving base station(s), which UE 205 may combine with its internal UE Rx-Tx time difference measurements obtained at operation 235.

If UE 205 started to measure the UE Rx-Tx time difference at operation 235, UE 205 may look up a measurement which is as close in temporal proximity as is possible to a received RTT measurement, for example, based at least partially on a system frame number (SFN) or any other time stamp information included in measurements.

If UE 205 and/or location server 215 had requested periodic or event triggered measurements at operations 230 or 240, respectively, the BS/RAN 210 may continue to provide the requested measurements at operation 265, which may be transmitted to UE 205 at operation 270 whenever reporting criteria are met such as, for example, an expiration of a desired reporting interval, or a triggering of an event such as a measurement changing by at least a threshold value or amount as compared to a previous measurement for a certain amount. Operations 265-275 may be repeated until a desired number of reports have been attained, or until the method 200 has been cancelled by UE 205, location server 215, or BS/RAN 210.

A method as discussed above may enable UE-based location determination using "Enhanced Cell-ID" or other location technologies such as U-TDOA, for example, which may require base station or other network based measurements at the UE, possibly in combination with UE measurements of GNSS satellites and network base stations and access points, with minimal impact to existing location protocol standards and architectures. The OMA LPPe reverse mode of a Location Procedure may be extended to enable UE-based location using network based measurements.

Figure 3:
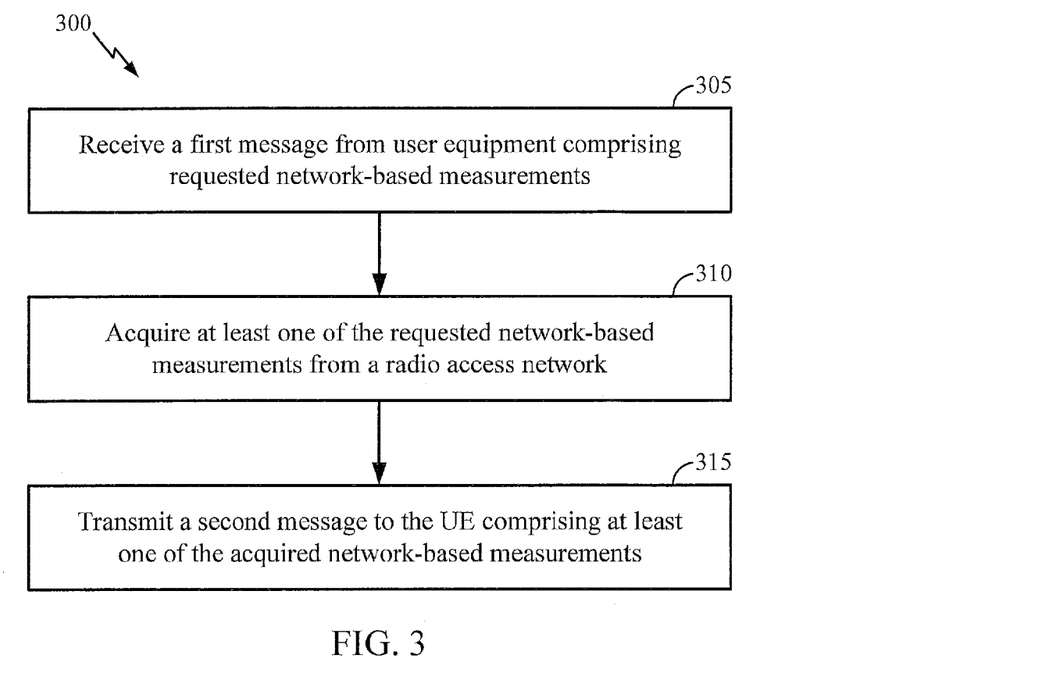
FIG. 3 is a flow diagram of a method for a location server to provide network-based measurements to a UE according to an implementation.

FIG. 3 is a flow diagram of a method 300 for a location server to provide network-based measurements to a UE according to an implementation. At operation 305, a first message may be received by the location server from user equipment (UE). The first message may comprise one or more requested network-based measurements. Operation 305 is optional and in some designs may not occur. At operation 310 and if operation 305 did occur, at least one of the one or more requested network-based measurements may be acquired from a radio access network serving the UE. If operation 305 did not occur, one or more network-based measurements may be acquired by the location server from a radio access network serving the UE. The network based measurements may be decided by the location server and may be measurements indicated as supported by the UE in a Provide Capabilities message received earlier by the location server from the UE. At operation 315, a second message may be transmitted to the UE comprising at least one of the one or more acquired network-based measurements.

Figure 4:
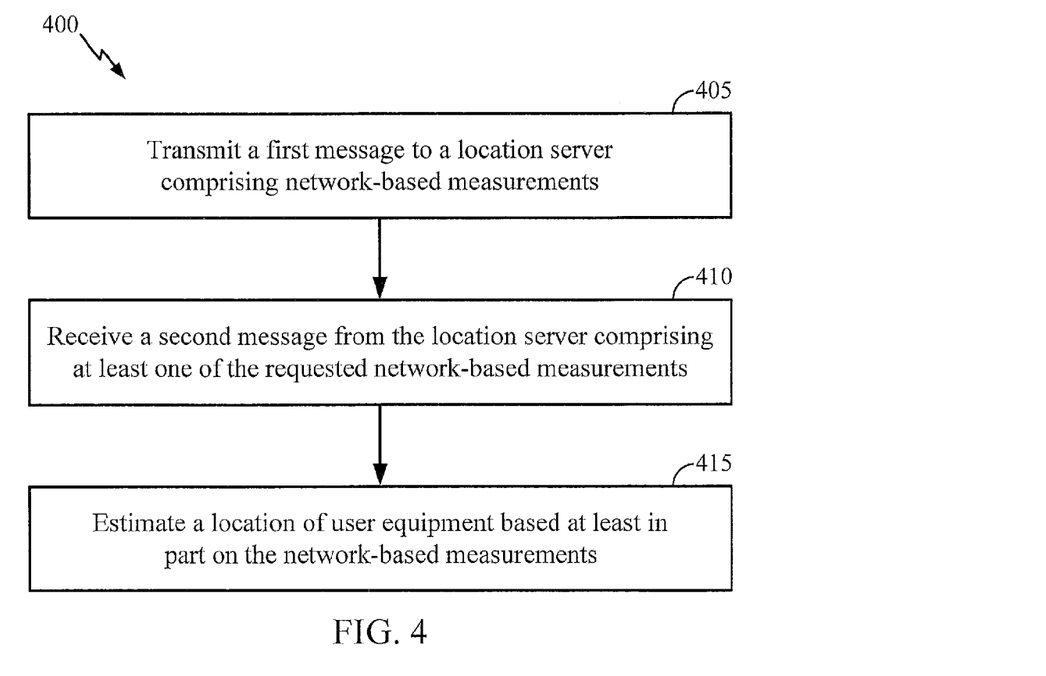
FIG. 4 is a flow diagram of a method for a UE to request and receive network-based measurements according to an implementation.

FIG. 4 is a flow diagram of a method 400 for a UE to request and receive network-based measurements according to an implementation. At operation 405, a first message may be transmitted by the user equipment (UE). The first message may comprise one or more requested network-based measurements. Operation 405 is optional and in some designs may not occur. At operation 410, a second message is received that may include at least one of the one or more network-based measurements. If operation 405 did occur, the one or more network based measurements received in operation 410 may comprise measurements requested by the UE in operation 405. If operation 405 did not occur, the one or more network based measurements received in operation 410 may comprise measurements supported by the UE. For example, the first message may be sent to a location server and the second message may be received from the location server. At operation 415, the UE may determine its location using the network based measurements received in operation 410.

Figure 5:
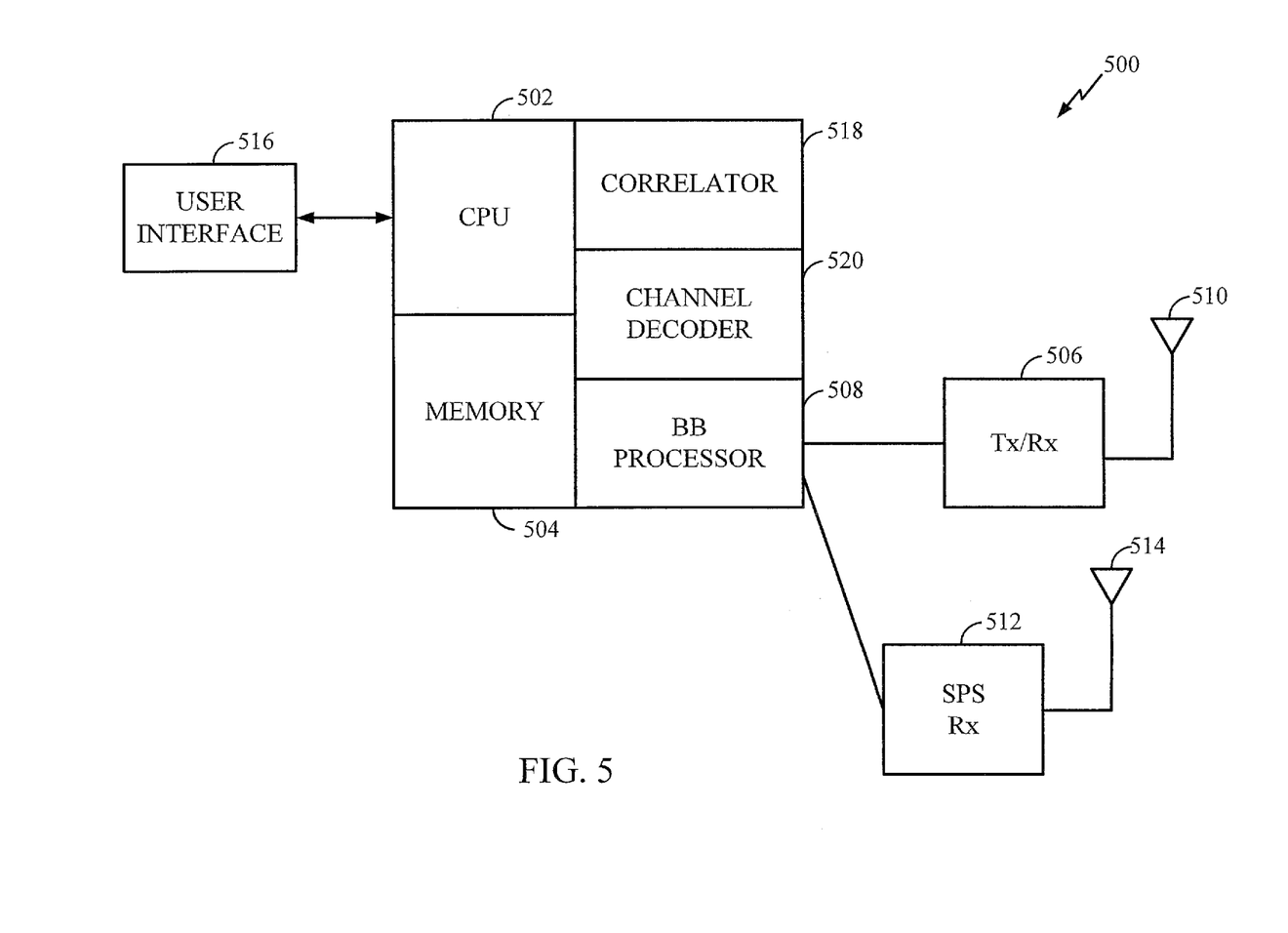
FIG. 5 is a schematic diagram of a Secure User Plane Location (SUPL) Enabled Terminal (SET) according to a particular implementation.

FIG. 5 is a schematic diagram of a UE 500, which may for example be UE 105 in FIG. 1 or UE 205 in FIG. 2, according to a particular implementation. UE 500 may include a transceiver 506 to modulate an RF carrier signal with baseband information, such as voice or data, onto an RF carrier, and demodulate a modulated RF carrier to obtain such baseband information. An antenna 510 may transmit a modulated RF carrier over a wireless communications link and receive a modulated RF carrier over a wireless communications link.

Baseband processor 508 may provide baseband information from CPU 502 to transceiver 506 for transmission over a wireless communications link. Here, CPU 502 may obtain such baseband information from an input device within user interface 516. Baseband processor 508 may also be adapted to provide baseband information from transceiver 506 to CPU 502 for transmission through an output device within user interface 516.

SPS receiver (SPS Rx) 512 may receive and/or demodulate transmissions from transmitters through SPS antenna 514, and provide demodulated information to correlator 518. Correlator 518 may derive correlation functions from the information provided by receiver 512. Correlator 518 may also derive pilot-related correlation functions from information relating to pilot signals provided by transceiver 506. This information may be used by a subscriber station to acquire wireless communications services.

Channel decoder 520 may decode channel symbols received from baseband processor 508 into underlying source bits. In one example where channel symbols comprise convolutionally encoded symbols, channel decoder 520 may comprise a Viterbi decoder. In a second example, where channel symbols comprise serial or parallel concatenations of convolutional codes, channel decoder 520 may comprise a turbo decoder.

Memory 504 may store machine-readable instructions executable to perform one or more of processes, examples, implementations, or examples thereof, which have been described or suggested. CPU 502 may access and/or execute such machine-readable instructions. Through execution of machine-readable instructions, CPU 502 may direct correlator 518 to analyze SPS correlation functions provided by correlator 518, derive measurements from the peaks thereof, and/or determine whether an estimate of a location is sufficiently accurate. However, these are merely examples of tasks that may be performed by a CPU in a particular aspect and claimed subject matter in not limited in these respects.

In a particular example, CPU 502 at a subscriber station may estimate a location the subscriber station based, at least in part, on signals received from SVs as illustrated above. CPU 502 may also be adapted to determine a code search range for acquiring a second received signal based, at least in part, on a code phase detected in first received signals as illustrated above according to particular examples.

Figure 6:
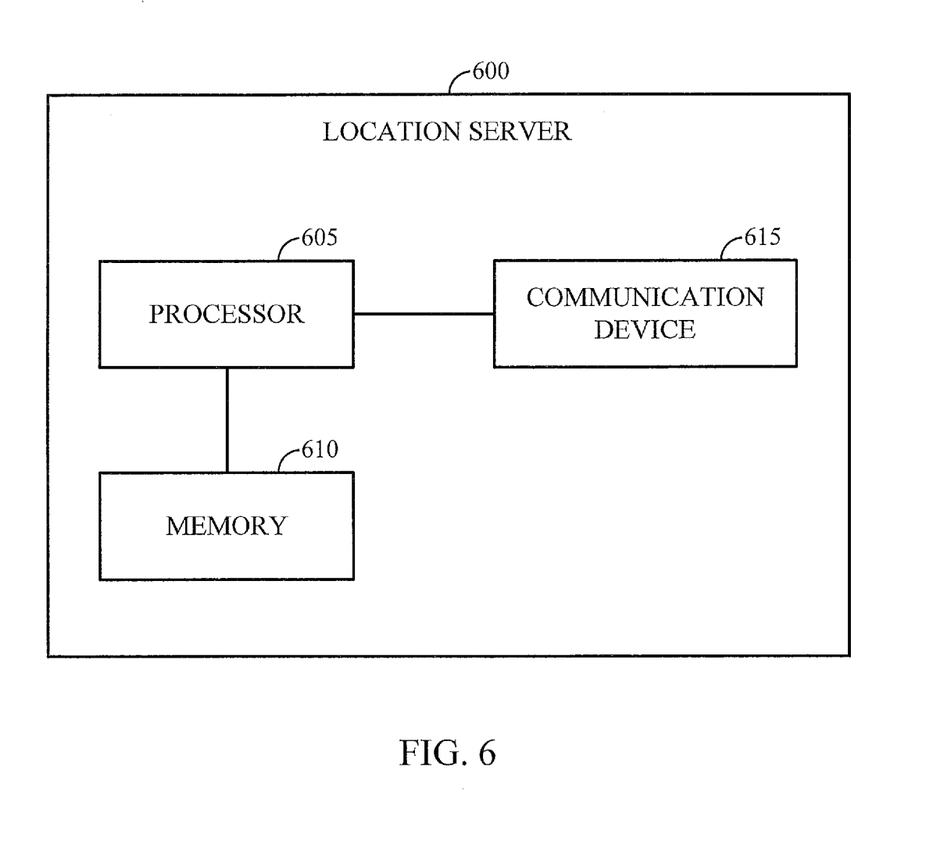
FIG. 6 is a schematic diagram of a location server according to one particular implementation.

FIG. 6 is a schematic diagram of a location server 600, which may, for example, comprise SAS 116, E-SMLC 144 or SLP 150 in FIG. 1 or location server 215 in FIG. 2, according to one particular implementation. As shown, location server 600 may include a processor 605, a memory 610, and a communication device 615. The memory 610 may store instructions, such as program code, that may be executable by processor 605. Communication device 615 may include an antenna for communicating and/or receiving wireless transmissions. The communication device 615 may also include a modem or other device from receiving communications via a hard-wired connection to a base station or RAN.

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data or information as expressed by a particular state of the storage media. For example, an electronic signal representative of data or information may be "stored" in a portion of the storage media (e.g., memory) by affecting or changing the state of such portions of the storage media to represent data or information as binary information (e.g., ones and zeros). As such, in a particular implementation, such a change of state of the portion of the storage media to store a signal representative of data or information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, includes compact disc (CD), laser disc, optical disc, digital versatile disc (DVD), floppy disk and blue-ray disc where disks usually reproduce data magnetically, while discs reproduce data optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In one particular implementation, a mobile device may, for example, be capable of communicating with one or more femtocells facilitating or supporting communications with the mobile device for the purpose of estimating its location, orientation, velocity, acceleration, or the like. As used herein, "femtocell" may refer to one or more smaller-size cellular base stations that may be enabled to connect to a service provider's network, for example, via broadband, such as, for example, a Digital Subscriber Line (DSL) or cable. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example. However, such details relating to femtocells are merely examples, and claimed subject matter is not so limited.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions or data may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing apparatus or device. In the context of this Specification, therefore, a special purpose computer or a similar special purpose electronic computing device or apparatus is capable of manipulating or transforming signals, typically represented as physical electronic, electrical, or magnetic quantities within memories, registers, or other information storage devices, transmission devices, or display devices of the special purpose computer or similar special purpose electronic computing device or apparatus.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

The invention claimed is:

1. A method for performing location services, comprising:
   acquiring one or more network-based timing or Angle of Arrival (AOA) signal measurements, at a location server, of signals transmitted by a target user equipment (UE) to a radio access network serving the target UE, wherein the one or more network-based timing or AOA signal measurements include signal measurements made by one or more network elements within the radio access network; and
   transmitting a first message to the target UE, from the location server, the first message comprising at least one of the one or more network-based timing or AOA signal measurements;
   wherein a location of the target UE is capable of being estimated by the target UE based at least in part on the one or more network-based timing or AOA signal measurements.

2. The method of claim 1 further comprising receiving a second message at the location server from the target UE requesting the one or more network-based timing or AOA signal measurements.

3. The method of claim 2, wherein the second message comprises an Open Mobile Alliance (OMA) Long Term Evolution Positioning Protocol extensions (LPPe) Request Location Information message.

4. The method of claim 2, wherein the second message comprises a request for a periodic or event triggered network measurement delivery.

5. The method of claim 2, further comprising transmitting the first message periodically or at least partially in response to the at least one of the one or more network-based timing or AOA signal measurements changing by at least a threshold amount relative to one or more previously reported network-based timing or AOA signal measurements.

6. The method of claim 2, further comprising notifying the target UE of capabilities of the location server to provide the one or more network-based timing or AOA signal measurements prior to receiving the second message from the target UE.

7. The method of claim 6, further comprising transmitting the capabilities of the location server to the target UE via an Open Mobile Alliance (OMA) Long Term Evolution Positioning Protocol extensions (LPPe) Provide Capabilities message.

8. The method of claim 1, wherein the first message comprises an Open Mobile Alliance (OMA) Long Term Evolution Positioning Protocol extensions (LPPe) Provide Location Information message.

9. The method of claim 1, wherein the one or more network-based timing or AOA signal measurements comprise a round trip time measurement.

10. The method of claim 1, wherein the one or more network-based timing or AOA signal measurements comprise a transmitter (Tx)-receiver (Rx) time difference measurement.

11. The method of claim 1, wherein the one or more network-based timing or AOA signal measurements comprise an Uplink Time (Difference) Of Arrival measurement.

12. The method of claim 1, wherein the one or more network elements include at least one base station.

13. The method of claim 1, wherein the one or more network elements include at least one Location measurement Unit (LMU).

14. The method of claim 1, wherein the one or more network elements include at least one WiFi Access Point.

15. The method of claim 1, further comprising notifying the location server of capabilities of the target UE wherein the capabilities of the target UE indicate a capability of the target UE to use the one or more network-based timing or AOA signal measurements.

16. The method of claim 1, wherein the one or more network-based timing or AOA signal measurements comprise one or more Universal Mobile Telecommunication System (UMTS)-based signal measurements.

17. The method of claim 1, wherein the one or more network-based timing or AOA signal measurements comprise one or more Long Term Evolution (LTE) based signal measurements.

18. The method of claim 1 wherein the location server comprises at least one of a Standalone Serving Mobile Location Center (SAS), an Evolved Serving Mobile Location Center (E-SMLC), or a Secure User Plane Location (SUPL) Location Platform (SLP).

19. The method of claim 1 wherein the radio access network comprises a Long Term Evolution (LTE) network and the one or more network-based timing or AOA signal measurements are acquired using Long Term Evolution Positioning Protocol Annex (LPPa).

20. The method of claim 1, wherein the one or more network-based timing or AOA signal measurements comprise at least a first network-based signal measurement obtained from a first network device and a second network-based signal measurement obtained from a second network device.

21. A location server, comprising:
a receiver to receive one or more messages;
a transmitter to transmit one or more messages; and
a processor to:
process one or more network-based timing or Angle of Arrival (AOA) signal measurements obtained from signals transmitted by a target user equipment (UE) to a radio access network serving the target UE, wherein the one or more network-based timing or AOA signal measurements include signal measurements made by one or more network elements within the radio access network, and initiate transmission of a first message to the target UE comprising at least one of the one or more network-based timing or AOA signal measurements.

22. The location server of claim 21, wherein the processor is further capable of processing a second message received from the target UE requesting the one or more network-based timing or AOA signal measurements.

23. The location server of claim 22, wherein second message comprises an Open Mobile Alliance (OMA) Long Term Evolution Positioning Protocol extensions (LPPe) Request Location Information message.

24. The location server of claim 22, wherein the second message comprises a request for a periodic or event triggered network measurement delivery.

25. The location server of claim 22, wherein the processor is further capable of initiating transmission, via the transmitter, of the first message periodically or at least partially in response to the at least one of the one or more network-based timing or AOA signal measurements changing by at least a threshold amount relative to one or more previously reported measurements.

26. The location server of claim 22, wherein the processor is further capable of initiating transmission of a message to the target UE to notify the target UE of capabilities of the location server to provide the one or more network-based timing or AOA signal measurements prior to receiving the second message from the target UE.

27. The location server of claim 26, wherein the capabilities of the location server are transmitted to the target UE via an Open Mobile Alliance (OMA) Long Term Evolution Positioning Protocol extensions (LPPe) Provide Capabilities message.

28. The location server of claim 21, wherein the first message comprises an Open Mobile Alliance (OMA) Long Term Evolution Positioning Protocol extensions (LPPe) Provide Location Information message.

29. The location server of claim 21, wherein one or more network-based timing or AOA signal measurements comprise a round trip time measurement.

30. The location server of claim 21, wherein the one or more network-based timing or AOA signal measurements comprise a transmitter (Tx)-receiver (Rx) time difference measurement.

31. The location server of claim 21, wherein the one or more network-based timing or AOA signal measurements comprise an Uplink Time (Difference) Of Arrival measurement.

32. The location server of claim 21, wherein the one or more network elements include at least one base station.

33. The location server of claim 21, wherein the processor is further capable of processing a message notifying the location server of capabilities of the target UE, wherein the capabilities of the target UE indicate a capability of the target UE to use the one or more network-based timing or AOA signal measurements.

34. The location server of claim 21, wherein the one or more network-based timing or AOA signal measurements comprise one or more Universal Mobile Telecommunication System (UMTS)-based signal measurements.

35. The location server of claim 21, wherein the one or more network elements include at least one Location measurement Unit (LMU).

36. The location server of claim 21, wherein the one or more network elements include at least one WiFi Access Point.

37. The location server of claim 21, wherein the one or more network-based timing or AOA signal measurements comprise one or more Long Term Evolution (LTE) based signal measurements.

38. The location server of claim 21, wherein the location server comprises at least one of a Standalone Serving Mobile Location Center (SAS), an Evolved Serving Mobile Location Center (E-SMLC), or a Secure User Plane Location (SUPL) Location Platform (SLP).

39. The location server of claim 21, wherein the radio access network comprises a Long Term Evolution (LTE) network and the one or more network-based timing or AOA signal measurements are acquired using Long Term Evolution Positioning Protocol Annex (LPPa).

40. An apparatus, comprising:
  means for acquiring one or more network-based timing or Angle of Arrival (AOA) signal measurements, at a location server, of signals transmitted by a target user equipment (UE) to a radio access network serving the target UE, wherein the one or more network-based timing or AOA signal measurements include signal measurements made by one or more network elements within the radio access network; and
  means for transmitting a first message to the target UE comprising at least one of the one of the one or more network-based timing or AOA signal measurements.

41. The apparatus of claim 40, further comprising means for processing a second message received from the target UE requesting the one or more network-based timing or AOA signal measurements.

42. The apparatus of claim 41, wherein the second message comprises an Open Mobile Alliance (OMA) Long Term Evolution Positioning Protocol extensions (LPPe) Request Location Information message.

43. The apparatus of claim 41, wherein the second message comprises a request for a periodic or event triggered network measurement delivery.

44. The apparatus of claim 41, wherein the means for transmitting is capable of transmitting a message to the target UE to notify the target UE of capabilities of the apparatus to provide the one or more network-based timing or AOA signal measurements prior to receiving the second message from the target UE.

45. The apparatus of claim 44, wherein the capabilities of the apparatus are transmitted to the target UE via an Open Mobile Alliance (OMA) Long Term Evolution Positioning Protocol extensions (LPPe) Provide Capabilities message.

46. The apparatus of claim 40, wherein the first message comprises an Open Mobile Alliance (OMA) Long Term Evolution Positioning Protocol extensions (LPPe) Provide Location Information message.

47. The apparatus of claim 40, wherein the one or more network-based timing or AOA signal measurements comprise a round trip time measurement.

48. The apparatus of claim 40, wherein the one or more network-based timing or AOA signal measurements comprise a transmitter (Tx)-receiver (Rx) time difference measurement.

49. The apparatus of claim 40, wherein the one or more network-based timing or AOA signal measurements comprise an Uplink Time (Difference) Of Arrival measurement.

50. The apparatus of claim 40, wherein the means for transmitting is capable of transmitting the first message periodically or at least partially in response to the at least one of the one or more network-based timing or AOA signal measurements changing by at least a threshold amount relative to a one or more previously reported measurements.

51. The apparatus of claim 40, wherein the one or more network elements include at least one base station.

52. The apparatus of claim 40, wherein the one or more network-based timing or AOA signal measurements comprise one or more Universal Mobile Telecommunication System (UMTS)-based signal measurements.

53. The apparatus of claim 40, wherein the apparatus comprises at least one of a Standalone Serving Mobile Location Center (SAS), an Evolved Serving Mobile Location Center (E-SMLC), or a Secure User Plane Location (SUPL) Location Platform (SLP).

54. An article comprising:
  a non-transitory storage medium having machine-readable instructions stored thereon which are executable by a special purpose computing apparatus to:
  process, at a location server, one or more network-based timing or Angle of Arrival (AOA) signal measurements of signals transmitted by a target user equipment (UE) to a radio access network serving the target UE, wherein the one or more network-based timing or AOA signal measurements include signal measurements made by one or more network elements within the radio access network, wherein the signal measurements include at least a round trip time measurement; and
  initiate transmission of a first message to the target UE comprising at least one of the round trip time measurement.

55. The article of claim 54, wherein the instructions are further executable by the special purpose computing apparatus to process a second message received from the target UE based at least in part on the one or more network-based timing or AOA signal measurements.

56. The article of claim 55, wherein the instructions are further executable by the special purpose computing apparatus to initiate transmission of a message to notify the target UE of capabilities of a location server to provide the one or more network-based timing or AOA signal measurements prior to receiving the second message from the target UE.

57. The article of claim 56, wherein the instructions are further executable by the special purpose computing apparatus to initiate transmission of the capabilities of the location server to the target UE via an Open Mobile Alliance (OMA) Long Term Evolution Positioning Protocol extensions (LPPe) Provide Capabilities message.

58. A method, at a target user equipment (UE), comprising:
  receiving a first message from a location server comprising one or more network-based timing or Angle of Arrival (AOA) signal measurements of signals transmitted by the target UE, wherein the one or more network-based timing or AOA signal measurements include signal measurements made by one or more network elements within the radio access network; and
  determining a location of the target UE based at least in part on the one or more network-based timing or AOA signal measurements.

59. The method of claim 58, further comprising transmitting a second message to the location server requesting the one or more network-based timing or AOA signal measurements.

60. The method of claim 59, wherein the second message comprises an Open Mobile Alliance (OMA) Long Term Evolution Positioning Protocol extensions (LPPe) Request Location Information message.

61. The method of claim 59, wherein the second message comprises a request for periodic or event triggered network measurement delivery.

62. The method of claim 59, further comprising receiving capabilities of the location server to provide the one or more network-based timing or AOA signal measurements prior to transmitting the second message to the location server.

63. The method of claim 62, further comprising receiving the capabilities of the location server from the location server via an Open Mobile Alliance (OMA) Long Term Evolution Positioning Protocol extensions (LPPe) Provide Capabilities message.

64. The method of claim 58, wherein the first message comprises an Open Mobile Alliance (OMA) Long Term Evolution Positioning Protocol extensions (LPPe) Provide Location Information message.

65. The method of claim 58, wherein the one or more network-based timing or AOA signal measurements comprise a round trip time measurement.

66. The method of claim 58, wherein the one or more network-based timing or AOA signal measurements comprise a transmitter (Tx)-receiver (Rx) time difference measurement.

67. The method of claim 58, wherein the one or more network-based timing or AOA signal measurements comprise an Uplink Time (Difference) Of Arrival measurement.

68. The method of claim 58, wherein the one or more network elements include at least one base station.

69. The method of claim 58, further comprising notifying the location server of capabilities of the target UE, wherein the capabilities of the target UE indicate a capability of the target UE to use the one of more network-based timing or AOA signal measurements.

70. The method of claim 58, further comprising combining the one or more network-based timing or AOA signal measurements with target UE-based signal measurements to estimate a location of the target UE.

71. A target user equipment (UE), comprising:
a transmitter to transmit one or more messages; a receiver to receive one or more messages; and
a processor to:
process a first message received from a location server, the first message comprising one or more network-based timing or Angle of Arrival (AOA) signal measurements of signals transmitted by the UE, wherein the one or more network-based timing or AOA signal measurements include signal measurements made by one or more network elements within a radio access network, wherein the signal measurements include at least a round trip time measurement; and
estimate a location of the target UE based at least in part on the one or more network-based timing or AOA signal measurements.

72. The target UE of claim 71, wherein the processor is capable of initiating transmission of a second message to the location server requesting the one or more network-based timing or AOA signal measurements.

73. The target UE of claim 71, wherein the one or more network elements include at least one base station.

74. The target UE of claim 71, wherein the processor is capable of combining the one or more network-based timing or AOA signal measurements with target UE-based signal measurements to estimate a location of the target UE.

75. A target user equipment (UE), comprising:
means for receiving a first message from a location server comprising one or more network-based timing or Angle of Arrival (AOA) signal measurements of signals transmitted by the target UE, wherein the one or more network-based timing or AOA signal measurements include signal measurements made by one or more network elements within a radio access network; and
means for estimating a location of the target UE based at least in part on the one or more network-based timing or AOA signal measurements.

76. The target UE of claim 75, further comprising means for initiating transmission of a second message to the location server requesting the one or more network-based timing or AOA signal measurements.

77. The target UE of claim 75, wherein the one or more network elements include at least one base station.

78. The target UE of claim 75, further comprising a means for combining the one or more network-based timing or AOA signal measurements with target UE-based signal measurements to estimate a location of the target UE.

79. An article comprising:
a non-transitory storage medium having machine-readable instructions stored thereon which are executable by a special purpose computing apparatus to process a first message received at a target user equipment (UE) from the location server, the first message comprising one or more network-based timing or Angle of Arrival (AOA) signal measurements of signals transmitted by the target UE, wherein the network-based timing or AOA signal measurements include signal measurements made by one or more network elements within a radio access network; and
means for estimating a location of the target UE based at least in part on the one or more network-based timing or AOA signal measurements.

80. The article of claim 79, wherein the instructions are further executable by the special purpose computing apparatus to initiate transmission of a second message to the location server requesting the one or more network-based timing or AOA signal measurements.

81. The article of claim 79, wherein the instructions are further executable by the special purpose computing apparatus to combine the one or more network-based timing or AOA signal measurements with target UE-based signal measurements to estimate a location of the target UE.

* * * * *